United States Patent
Kölbel et al.

(10) Patent No.: US 12,018,208 B2
(45) Date of Patent: Jun. 25, 2024

(54) METHOD FOR UNBLOCKING A DEEP WELL PLUGGED BY AN ADSORBENT

(71) Applicant: EnBW Energie Baden-Württemberg AG, Karlsruhe (DE)

(72) Inventors: Thomas Kölbel, Karlsruhe (DE); Elif Kaymakci, Waldbronn (DE); Laura Herrmann, Karlsruhe (DE); Magdalena Graczyk-Zajac, Heidelberg (DE)

(73) Assignee: EnBW Energie Baden-Württemberg AG, Karlsruhe (DE)

( * ) Notice: Subject to any disclaimer, the term of this patent is extended or adjusted under 35 U.S.C. 154(b) by 63 days.

(21) Appl. No.: 17/824,332

(22) Filed: May 25, 2022

(65) Prior Publication Data

US 2022/0380656 A1 Dec. 1, 2022

(30) Foreign Application Priority Data

Jun. 1, 2021 (DE) .................. 10 2021 114 229.6

(51) Int. Cl.
 *C09K 8/528* (2006.01)
(52) U.S. Cl.
 CPC .................... *C09K 8/528* (2013.01)
(58) Field of Classification Search
 CPC .................. C09K 8/528; C09K 8/72
 See application file for complete search history.

(56) References Cited

U.S. PATENT DOCUMENTS

| | | | |
|---|---|---|---|
| 4,101,425 A | 7/1978 | Young | |
| 4,480,691 A | 11/1984 | Herter et al. | |
| 4,589,488 A | 5/1986 | Schirmer | |
| 6,764,584 B2 | 7/2004 | Chang et al. | |
| 2002/0139532 A1 | 10/2002 | Todd et al. | |
| 2011/0017460 A1 | 1/2011 | Keatch et al. | |
| 2015/0283509 A1* | 10/2015 | Hoover | C07C 51/412 |
| | | | 423/605 |
| 2021/0155840 A1 | 5/2021 | Harrison et al. | |

FOREIGN PATENT DOCUMENTS

| | | |
|---|---|---|
| CN | 103272554 A | 9/2013 |
| CN | 108543516 A | 9/2018 |
| WO | 94/09253 A1 | 4/1994 |

OTHER PUBLICATIONS

Pankaj et al.; "Advance review on the exploitation of the prominent energy-storage element Lithium. Part II: From sea water and spent lithium ion batteries (LIBs)," Minerals Engineering, vol. 110, No. 28, Apr. 28, 2017, pp. 104-121.

* cited by examiner

*Primary Examiner* — Kumar R Bhushan
(74) *Attorney, Agent, or Firm* — Dilworth & Barrese, LLP

(57) ABSTRACT

A method is proposed for making geological deep wells that are clogged unblocked and capable of absorbing fluid again by adding an acid from the group of carboxylic acids and vinylogous carboxylic acids.

10 Claims, 1 Drawing Sheet

METHOD FOR UNBLOCKING A DEEP WELL PLUGGED BY AN ADSORBENT

Figure 1:
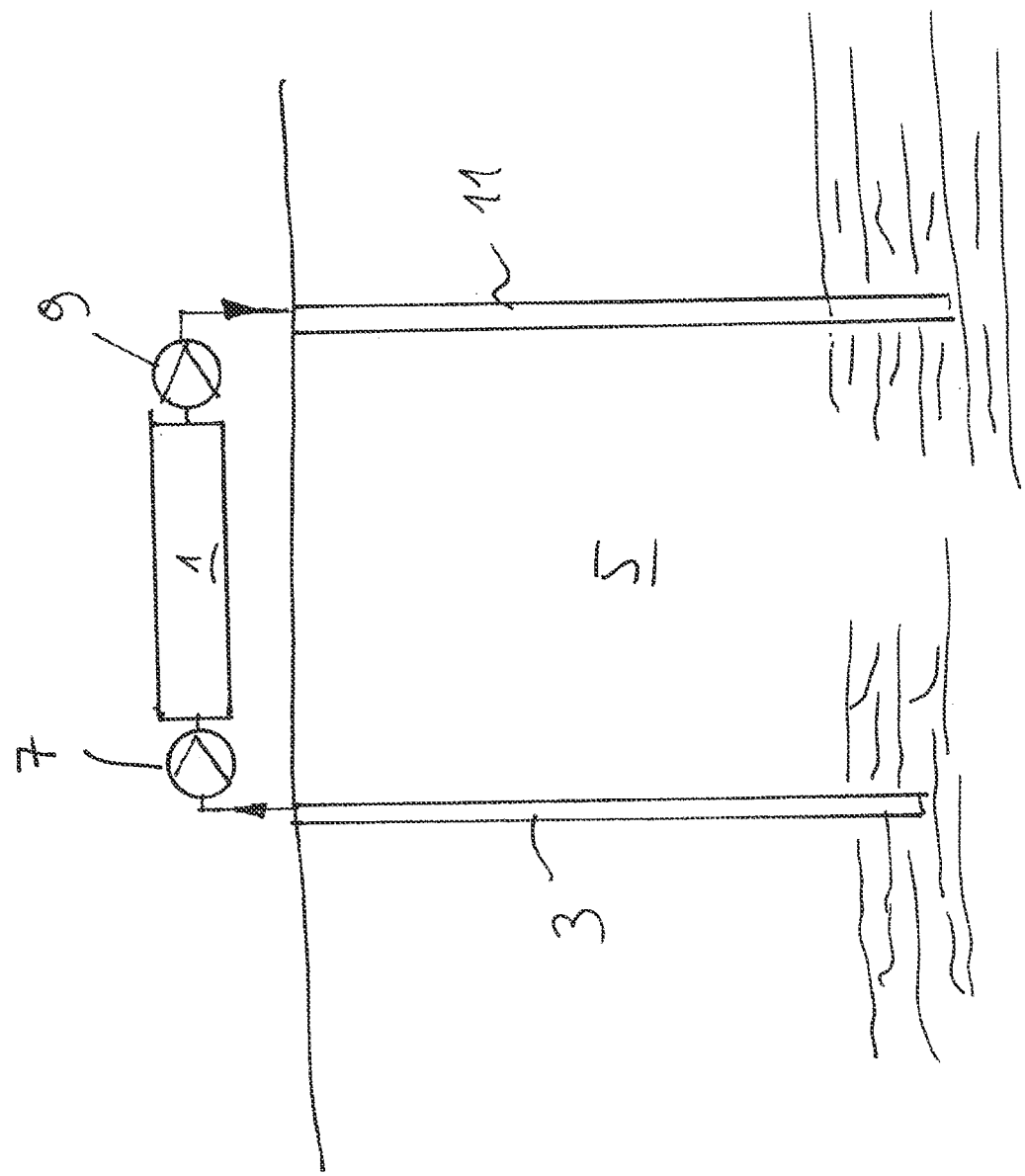

This application claims priority to German Patent Application No. 10 2021 114 229.6 filed on Jun. 1, 2021.

The present invention relates to a method for unblocking a deep well that is plugged or clogged by a manganese oxide adsorbent.

The terms "deep well" and "well" are sometimes used interchangeably in connection with the invention.

Due to its advantages, such as high electrical energy density, high working voltage, long cyclic life, lack of memory effect, etc., the rechargeable lithium-ion battery (more precisely, the lithium-ion accumulator) is widely used in notebook computers, cell phones and electric cars. Demand for lithium-ion batteries is rising sharply in the wake of electromobility, among other things. Accordingly, the demand for lithium carbonate is very high.

Currently, two different raw material sources are mainly used to produce lithium salts, specifically lithium ores, and brine. The term "brine" within the framework of the invention includes any aqueous solution containing lithium ions. In particular, groundwater, and deep water along with seawater or the "waste products" of seawater desalination plants fall under the term "brine." The invention relates predominantly to brine that is tapped by deep drilling, extracted to the earth's surface, used there and then returned to the subsurface via another deep well. The thermal use of the often very hot deep water (with a temperature greater than 100° C.) is called geothermal energy and is perhaps the best known use of deep water.

However, the brine or deep water produced from some deep wells contain various highly valuable raw materials (e.g., lithium ions), albeit in relatively low concentrations. In order to produce lithium salts from a brine containing merely few lithium ions (typically 10 to 1000 mg/L), their concentration should be 15,000 ppm or greater.

An established method for increasing the lithium ion concentration of brine to a level required for the production of lithium salts is the adsorption of lithium ions from a lithium-containing aqueous solution (brine).

U.S. Pat. No. 6,764,584 B2 and the applicant's subsequently published DE 10 2021 105 808 A1 describe such adsorption methods. In this process, an aqueous solution containing lithium is brought into contact with a manganese oxide adsorbent in one or more adsorber columns, so that at least parts of the lithium ions contained in the aqueous solution are adsorbed on the adsorbent.

Subsequently, the depleted brine (i.e., containing less lithium ions) is drained from the adsorber column and the lithium ions adhering to the adsorption agent are desorbed using a desorption agent (e.g., a mixture of water and hydrochloric acid (HCl)).

The depleted (and, in the case of thermal use, cooled) brine is then pumped into another deep well and reintroduced into the subsurface via this deep well, so that the water balance in the subsurface is not disturbed or impaired, or only slightly disturbed or impaired. At the end of the deep well, the subsurface sometimes has very small or narrow pores, cracks, and fissures. Through these, the deep water returns to the subsurface or is absorbed by it.

The reintroduction of brine into the subsurface after thermal and/or material utilization is usually also a component of the permit issued by the competent authority and is not at the discretion of the operator. In other words: If the deep water cannot be pumped back into the subsurface, the operation of the plant must be interrupted!

Methods for the production of a lithium adsorption agent (hereinafter also referred to as "adsorbent") are known from CN 103 272554 A and the applicant's subsequently published DE 10 2021 108 442 A1. Such adsorbent is in powder form. The grain size varies from the µm to the cm range. Particles of such size are likely to cause clogging in wells or deep wells in the course of accidents and other losses. In principle, the well/deep well can be affected by this at any depth, but particularly in the area of filters. When the brine escapes from the well into the surrounding rock, clogging may additionally occur in the area between the filter and the borehole wall, but also in the area of the reservoir (pore space and other cavities such as fissures, karst cavities, etc.). In principle, such clogging leads to reduced performance of wells and the reservoir as well, up to total loss.

The previously known adsorption methods work very well and economically. However, it cannot be ruled out that, due to a technical defect, human error or other reasons, a large amount of the adsorbent could unintentionally enter the depleted deep water and thus also the subsurface. There, the adsorbent clogs the cracks and fissures in the subsurface at the end of the borehole. As a result, the subsurface at the bottom of the borehole loses the ability to absorb the deep water. In the worst case, the operation of the entire plant must be stopped as a result.

The invention is based on the object of providing a method with the aid of which the clogging or plugging of a borehole, the annular gap between the filter and the bore wall and also the reservoir by adsorbent in the deep water can be prevented and reversed.

Tests have shown that carboxylic acid, dicarboxylic acid, tricarboxylic acid, and vinylogous carboxylic acid (including citric acid/ascorbic acid, but also malic acid and tartaric acid), or an acid from the group of the aforementioned acids, or a mixture thereof, are highly suitable for dissolving the adsorbent, which has entered the deep well due to damage or an operational accident, with one of such acids or a mixture of these acids. As a result, the adsorbent does not clog the fissures and cracks in the subsurface at the bottom of the deep well, but is dissolved.

It can then be absorbed by the porous subsurface together with one of the aforementioned acids and the deep water, where it can spread over a very large area.

Alternatively, and usually preferred, the dissolved adsorbent can be returned along with the acid from the reservoir and well back to the earth's surface for harmless disposal. After a defined exposure time, the well/deep well is pumped out.

By pumping the dissolved adsorbent and acid out of the reservoir and well, such fluid mixture does not enter the subsurface, so that unforeseen chemical reactions with the fluid in the reservoir, which could lead to sedimentation, can be safely ruled out.

In other words: The surprisingly simple solution according to the invention involves "unblocking" a plugged deep well by means of one of the aforementioned acids or a mixture of such acids. The acid dissolves the adsorbent and thereby removes the blockage.

It has proved particularly advantageous to use ascorbic acid, citric acid, or citric acid monohydrate. Such acids are inexpensive, are available in large quantities and are relatively easy to handle. They also occur in nature and therefore pose little risk to the environment. In addition, they do not require increased effort to ensure occupational health and safety.

In one advantageous embodiment of the method, at least part of the brine is removed from the deep well prior to the addition of one or more acids from the group of carboxylic acids, di- or tricarboxylic acids, vinylogous carboxylic acids. This makes it easy and highly effective to bring the acid to the site of blockage or clogging.

Alternatively, it is also possible to insert an injection probe in the deep well to any desired depth and to the bottom of the deep well. This allows the acid or mixture of acids to be injected specifically where the adsorbent to be dissolved is located. As a result, the acid or mixture of acids is specifically brought into contact with the adsorbent located there. In this way, the dissolution of the adsorbent becomes much more effective and efficient.

After a sufficient amount of the acid according to the invention has been delivered into the deep well at the desired depth, the injection probe can be withdrawn from the deep well again and the operation of the deep well can continue without any change.

In addition, the probe can also be used to pump the dissolved adsorbent and acid out of the well/deep well and dispose of it in a controlled manner. As a rule, such variant is preferred. In an additional advantageous embodiment, the ascorbic acid, or the acid from the group of carboxylic acids, di- or tricarboxylic acids, vinylogous carboxylic acids, or from a mixture thereof, may be further pressurized in addition to the hydrostatic pressure prevailing in the deep well. This can be done, for example, by closing the upper end of the deep well and pressurizing the fluid located in the deep well via a hydraulic pump. In this way, the acid is "forced" to a certain extent to the adsorbent, and the flushing out or loosening of the blockage in the cracks and fissures of the subsurface is simplified and accelerated. Such deep injection of the completely or partially dissolved adsorbent is an alternative especially if the adsorbent has already been transported far into the reservoir/subsurface and can no longer be pumped out. The method according to the invention is particularly effective if the adsorbent is an adsorption agent for adsorbing lithium and, in particular, if it is of the manganese oxide type.

According to the invention, the use of a carboxylic acid, a di- and tricarboxylic acid, a vinylogous carboxylic acid for dissolving a lithium adsorbent and/or a manganese oxide type adsorbent is also claimed.

Further advantages and advantageous embodiments of the invention can be seen in the following drawing, its description, and the claims. All features disclosed in the drawing, its description and the claims can be essential to the invention both individually and in any combination.

Within the framework of the invention, anhydrous citric acid ($C_6H_8O_7$) and citric acid monohydrate ($C_6H_8O_7\cdot H_2O$), which contains one molecule of water of crystallization per molecule of citric acid, are referred to as citric acid. Ascorbic acid ($C_6H_8O_6$) is an organic compound referred to as ascorbic acid within the framework of the invention.

Further advantages and advantageous embodiments of the invention can be seen in the drawing and its description.

DRAWING

The single FIGURE shows a schematic representation of two deep wells for the extraction of lithium-bearing brine.

DESCRIPTION OF THE EXEMPLARY EMBODIMENT

In FIG. 1, plant 1 for the extraction of lithium ions from a lithium-containing brine or from lithium-containing deep water is shown in a highly simplified form and only as one block. An initial deep well 3, which is driven several thousand meters into subsurface 5 in some cases, is upstream of plant 1. At the bottom of deep well 3, subsurface 5 is usually porous or fissured and karstified. In many cases, cracks or fissures are purposefully introduced by deep-injecting a fluid under pressure into the deep well after first deep well 3 and/or second deep well 11 have been made. As a result, subsurface 5 cracks at the end of deep well 3 or 11 and forms the desired cracks and fissures ("hydraulic stimulation"). Such cracks and fissures are desirable, because they enable, or facilitate, the pumping of deep water (not shown in FIG. 1) from first deep well 3, but also the re-injection of the water in second deep well 11.

The deep water/brine in first deep well 3 is conveyed by first pump 7 and fed to plant 1. The invention is not limited to the aforementioned use of plant 1. There could also be additional or alternative geothermal utilization of the deep water or lithium-bearing brine conveyed by first deep well 3 in plant 1. After the deep water or brine is processed in plant 1, it is pumped by optional second pump 9 into second deep well 11.

Second deep well 11 is used to reintroduce into subsurface 5 the depleted deep water or brine. In many cases, the lengths of first deep well 3 and second deep well 11 are approximately the same.

In the case of second deep well 11, the subsurface at its lower end should also be as porous, fissured or karstified as possible, so that it can absorb the depleted brine.

If the subsurface does not naturally already have sufficient porosity or permeability and transmissibility, i.e., liquid absorption capacity, it can also be provided with cracks and fissures by hydraulic deep injection, in order to improve liquid absorption capacity. It is obvious that such fissures and cracks are relatively narrow, so that they can be plugged by solids, such as an adsorbent, which has entered second deep well 11, for example, due to a malfunction of plant 1. The liquid absorption capacity of the subsurface is then negatively reduced. This can either lead to an increased demand of electrical energy for pump 9 or even to the fact that the flow rate or the delivery capacity of pump 9 decreases so much due to the increased flow resistance in subsurface 5 that upstream plant 1 can no longer be operated economically or operated at all.

According to the invention, it is now provided that, in the event of such a blockage or plugging of the subsurface or of the deep well 11, a carboxylic acid, a di- or tricarboxylic acid, a vinylogous carboxylic acid or an acid from the group of the aforementioned acids or a mixture thereof is brought to the bottom of second deep well 11 or to a location of the deep well that is clogged by adsorbent. Surprisingly, it has been found that the specified acids dissolve adsorbents, in particular adsorption agents for lithium or manganese oxide type adsorbents, very well.

This makes it possible to dissolve an adsorbent that has become trapped in the cracks and fissures at the bottom of second deep well 11 or in deep well 11. This restores the porosity, fissurization and karst cavities of subsurface 5 at the bottom of second deep well 11, and also the continuity of deep well 11, or prevents a negative impairment of such properties and thus also of the absorption capacity for deep water or other fluids.

Another variation is to lower an (injection) probe (not shown) into deep well 11 until the end of the probe reaches the bottom of deep well 11 or the location of the clogging. Then, the probe delivers the acid into deep well 11 and can directly dissolve the adsorption agent present there without any distribution losses.

Usually, after the adsorbent has been dissolved, it is pumped out again through the probe together with the acid and disposed of.

Furthermore, by increasing the pressure on the acid or liquid located in second deep well 11, it is possible to force the acid into the "clogged" fissures and cracks in the subsurface, thereby accelerating the dissolution of the adsorption agent.

The invention claimed is:

1. A method for unblocking a deep well plugged by an adsorbent, comprising the steps of
   pumping liquid out of a first deep well,
   treating the liquid pumped out of the first deep well,
   pumping the thus-treated liquid into a second deep well, and
   introducing into said second deep well, one or more carboxylic acids selected from the group consisting of a monocarboxylic acid, a dicarboxylic acid, a tricarboxylic acid, a vinylogous carboxylic acid, should the second deep well be plugged or blocked.

2. The method of claim 1, wherein the carboxylic acid is selected from the group consisting of ascorbic acid, citric acid and/or citric acid monohydrate.

3. The method of claim 1, wherein a part of brine located in the deep well is displaced from the deep well by the carboxylic acid.

4. The method of claim 1, wherein a probe is inserted into the deep well prior to the addition of the carboxylic acid, and the carboxylic acid is delivered through the probe to the desired depth of the deep well.

5. The method of claim 1, wherein after the dissolution of the adsorbent, the carboxylic acid and the dissolved adsorbent are pumped out of the deep well.

6. The method of claim 1, wherein the carboxylic acid is pressurized in addition to hydrostatic pressure prevailing in the deep well.

7. The method of claim 1, wherein the adsorbent is a lithium adsorption agent.

8. The method of claim 1, wherein the adsorbent is a manganese oxide type adsorbent.

9. The method of claim 1, wherein the carboxylic acid is introduced into the second deep well separately from pumping the thus-treated liquid into the second deep well.

10. The method of claim 9, wherein the carboxylic acid is introduced to either the bottom of the second deep well or location thereof clogged by adsorbent.

* * * * *